United States Patent [19]

Guiavarc'h

[11] 4,198,927
[45] Apr. 22, 1980

[54] AUTOMATIC LOCKS OR BOLTS FOR THE DOOR OF AN ANIMAL-RAISING CAGE, ESPECIALLY OF A CAGE FOR RAISING HOGS

[76] Inventor: Etienne Guiavarc'h, 55, rue Hervé de Guébriant, 29207 Landerneau, France

[21] Appl. No.: 897,413

[22] Filed: Apr. 18, 1978

[30] Foreign Application Priority Data

Apr. 21, 1977 [FR] France .................... 77 12654

[51] Int. Cl.² .................... A01K 1/02; A01K 29/00
[52] U.S. Cl. .................... 119/27
[58] Field of Search .................... 119/27, 50; 49/364

[56] References Cited

U.S. PATENT DOCUMENTS

| 579,484 | 3/1897 | Jarrett | 119/27 |
| 3,543,723 | 12/1970 | Van Gilst | 119/27 |
| 3,785,346 | 1/1974 | Dower | 119/27 |

*Primary Examiner*—Hugh R. Chamblee
*Attorney, Agent, or Firm*—Laff, Whitesel & Rockman

[57] ABSTRACT

In individual animal-raising cages, which serve as refectory and as dormitory, a door system is individually provided, which allows the entry of an animal into the cage, but which must forbid the entry of a second animal. The lock or bolt takes its locking position as soon as the door is lowered behind the first animal which has entered, and it prevents another animal from raising the door from the outside. On the contrary, when the first animal wishes to get out, it automatically unlocks the bolt or lock before lifting the door. Several embodiments are described.

10 Claims, 6 Drawing Figures

AUTOMATIC LOCKS OR BOLTS FOR THE DOOR OF AN ANIMAL-RAISING CAGE, ESPECIALLY OF A CAGE FOR RAISING HOGS

The present invention relates to automatic bolts or locks for cage doors used in animal raising, and especially for the door of a cage serving as feeding area or refectory in the raising of hogs.

In the hog-raising installations, especially in the raising of sows, individual cages are used which make it possible for one sow to come to feed and to sleep. Each of those cages, serving as refectory and as dormitory, comprises a door system which makes it possible, upon the entering of a sow into the cage, to close the door or a small gate behind it. In principle, this is to prevent another animal from entering the same cage or to disturb the sow already there. Known door systems comprise a door capable of pivoting around a shaft, and of coming down behind the sow when the latter has sufficiently entered the cage to operate a member which starts the descending motion of the door. When the sow wishes to get out of the cage, it moves backwards, pushing the door while raising it, thus bringing the starting member back to its rest position.

Experience has shown that if that system were to operate correctly upon the entering or going out of a sow, it would not offer all guarantees with respect to the interdiction of opening the door, when in its low position, by an animal located outside of the cage.

One object of the present invention relates to providing a bolt or element solidly mounted on the door, which guarantees the interdiction of an opening the door from the outside, while in no way modifying the operation of the door by an animal located inside the cage. There is thus eliminated a drawback of the previously-known door systems.

According to a characteristic of the invention, there is provided for a bolt constituted by an L-shaped hook opened at the top and mounted on a fixed part of the frame of the cage. A catch is mounted on a tab, solid on the door. The catch engages in the hook when the door reaches its low position. At least one of the pivoting shafts of the door or hinges, on the side of the hook, is supported by an oval-shaped hole so that said shaft will be shifted toward the inside of the cage when the door is in its low position, thus bringing the catch to the bottom of the hook's L.

According to another characteristic, there is provided for a bolt which is constituted by an L-shaped hook opened at the bottom, mounted on a tab, solid on the door. A catch is mounted on a fixed part of the frame of the cage. The hook engages the catch when the door reaches its low position. At least one of the pivoting shafts or hinges of the door, on the side of the hook, is supported by an oval-shaped hole so that said shaft will be shifted inwardly in the cage when the door is in low position, thus bringing the bottom of the L-shaped hook in a position where it holds the catch wedged.

According to another characteristic, there is provided for a bolt constituted by a pendulum capable of pivoting around a horizontal axis, mounted solidly on the door, at approximately the middle of said door's width. The pendulum comprises an upper arm, the end of which is horizontally bent, and a lower arm comprising a vertical part and a C-shaped part which is relatively short, convex in the direction of the inside of the cage. The structure of the pendulum is such that its vertical part is effectively vertical when the door is lowered. The upper side of the bent part of the upper arm is then immediately below a horizontal projection solid on the frame of the cage. The arrow of the C is sufficient so that the back of the C, which is pushed from the inside toward the outside in the plane of the door, will produce an angular pivoting of the pendulum. The bent part no longer is under the projecting piece or lug when the door begins to be raised from the inside.

According to another characteristic, a first stop limits the angular rotation of the lower arm of the pendulum toward the inside of the cage.

According to another characteristic, a second stop limits the angular rotation of the lower arm of the pendulum toward the outside of the cage.

The characteristics of the invention which have been indicated above, as well as others, will appear more clearly upon reading the following description of examples of execution, said description being given with respect to the attached drawing in which.

Figure 1:
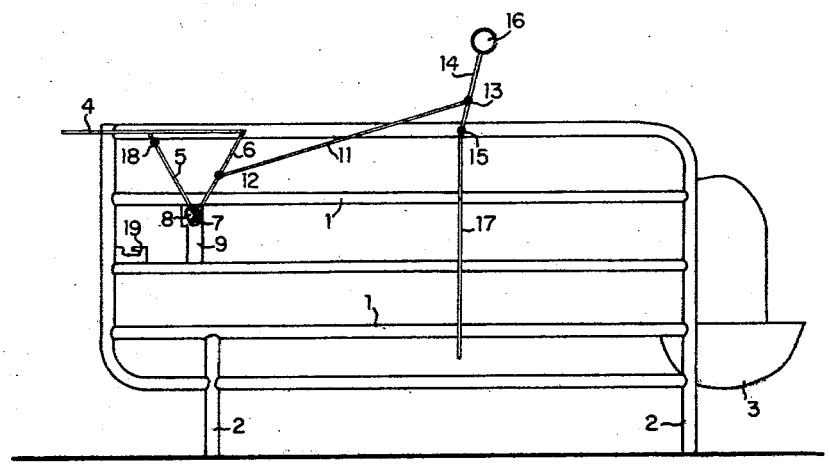
FIG. 1 is a schematic view, from the side, of an animal-raising cage in an open position, the door being fitted with a first embodiment of the bolt.

FIG. 1 shows a wall of the frame of an animal-raising cage, formed of metallic tubular elements 1, mounted on legs 2. To the fore of the cage, there is a classical feeding trough 3. The closing and opening system of the door is automatic and comprises door 4, mounted on arms 5 and 6, only one of which is visible. The free ends of these arms are affixed to the lateral risers of the door. Each of the common ends of arms 5,6 carry an end of axle or shaft 7 lodged inside a hole 8 of a vertical tab 9, solidly mounted on a horizontal tubular element 1. A motion-recall rod 11 has one end which can rotate around a shaft 12 carried by an arm 6. The other end of arm 11 can rotate around a shaft 13 carried by an arm 14 which is capable of pivoting, at one end, around a shaft 15 carried by an upper element 1. Arm 11 carries, at its free end, a mass 16, and a vertical curtain 17, solidly mounted at its upper part, on arm 14.

In the open cage position, door 4 is horizontal and it frees, under it, all of the height necessary for an animal to enter the cage from the left to the right, that is to say, toward the feeding trough 3. Curtain 17 is vertical, the angle between 17 and 14 being such that mass 16 is to the right of the vertical plane of 17, for stabilizing the whole in the position shown in FIG. 1. When the animal, which is inside the cage, moves toward the feeding trough 3. It hits against curtain 17, and pushes it toward the right, thus causing the rotation of arm 14 toward the left which drives rod 11, toward the left also. Rod 11 pushes, at 12, the arm 6 which drives door 4 and arm 5 in a rotation in a counterclockwise direction. Moreover, as soon as mass 16 has run through the vertical plane of shaft 15, it accelerates the movement of arm 14, of curtain 17 which rises completely, of rod 11, and of door 4. At the end of the movement or motion, those elements are in the position indicated in FIG. 2. In practice, the above-mentioned displacement is limited by a stop or piece not shown, so that door 4 will take the exact vertical position represented in FIG. 2. It is further specified that door 4, which may be made of crossed metallic tubular elements, comprises, preferably, in its inferior median part, an arc-shaped cutout inside which the rear part of the animal comes to engage when same wants to get out of the cage by lifting door 4.

For opening the door, the animal lifts, as indicated above, the central arc of door 4 and moves backwardly under the arc. Arms 5 and 6 rotate clockwise, rod 11 pushes arm 14 towards the right, and mass 16, as well as curtain 17, find again their initial positions.

Considering the angular positions of arm 14 at the opening and at the closing, it can be seen that it is more important to close the door than to open it. Normally an animal should not be able to lift the door 4, with its head, from the outside. That, however, may happen.

Figure 2:
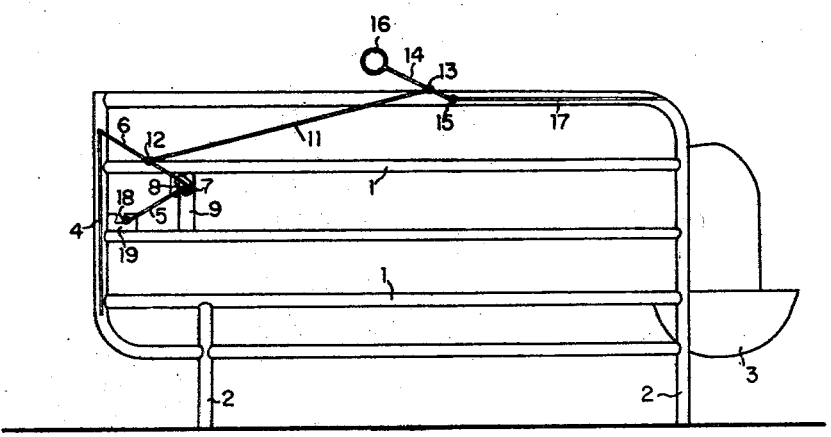
FIG. 2 is a schematic view of the cage in FIG. 1, in closed position.

It can be seen in FIG. 1, as well as in FIG. 2, that hole 8 is oval-shaped, thus making it possible for shaft 7 to rise slightly in the direction, for example, of arm 5 in the position of FIG. 1. Moreover, arm 5 carries a catch or lug piece 18 which, in the closed position of door 4, comes to engage in the opening of a hook 19 which is L-shaped and open upwardly, and is carried by an element 1. In the position indicated in FIG. 2, shaft 7 is at the bottom of hole 8. Therefore, it pulls catch 18 toward the right of the L of 19. In that case, an animal cannot raise the door from the outside, for it still tends to wedge catch 18 in the bottom of hook 19. On the other hand, when an animal wants to get out of the cage, it has a tendency to push door 4 back toward the left, which causes shaft 7 to rise in hole 8, and which drives catch 18 toward the left, making possible its release from hook 19.

Figure 3:
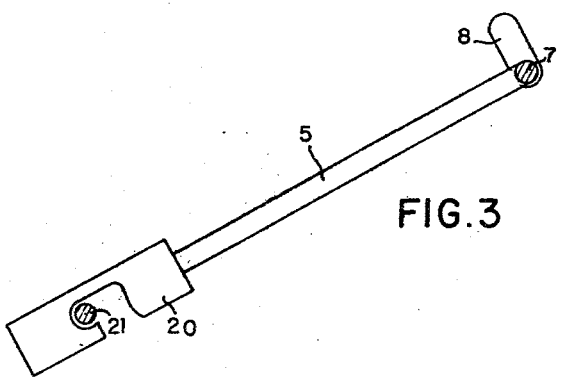
FIG. 3 is a partial schematic view of a second embodiment of the bolt, which can be fitted on the cages represented in FIGS. 1 and 2.

FIG. 3 shows a variation of the bolt in FIGS. 1 and 2, in which hook 20 is carried by arm 5 while catch 21 is affixed to the frame of the cage. The operation obviously is the reciprocal of that which has been described above. Shaft 7, at the bottom of hole 21, wedges against the bottom of an L-shaped hook 20, while its rising in part 8, when an animal gets out, unlocks 21.

Figure 4:
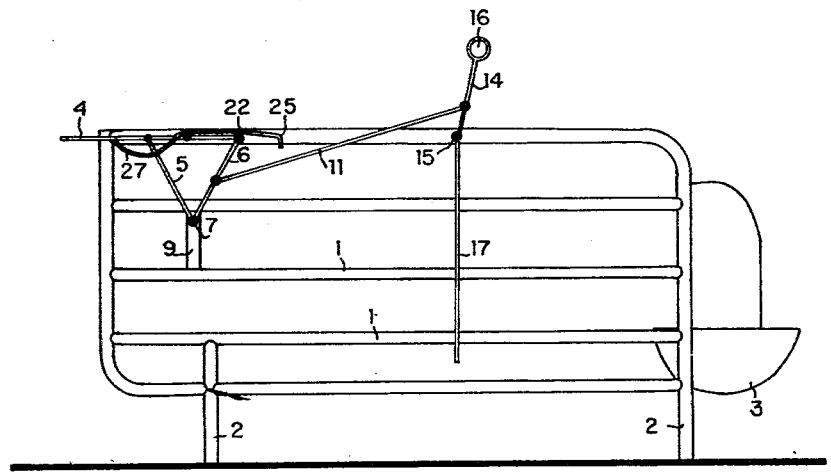
FIG. 4 is a schematic side view of an animal-raising cage in open position, the door being fitted with a third example of execution of the bolt.

FIG. 4 shows another embodiment of the bolts in FIGS. 1 to 3. On a horizontal bar 22 of door 4, there is mounted a sleeve 23 which carries a pendulum with an upper arm 24, the free end of which is bent to form a supporting surface 25. An inferior arm comprises a straight part 26 and a part presenting a C-shaped profile 27. Moreover, the frame of the cage comprises, in the vertical plane of the closed door, an upper crosspiece 28. Finally, the door further comprises two horizontal bars 29 and 30. It must be noted that, door 4 is constituted of mostly vertical tubular elements. Bar 22 and bars 29 and 30 are located centrally between and are left free of the two neighboring tubular elements of the middle of the door.

Figure 5:
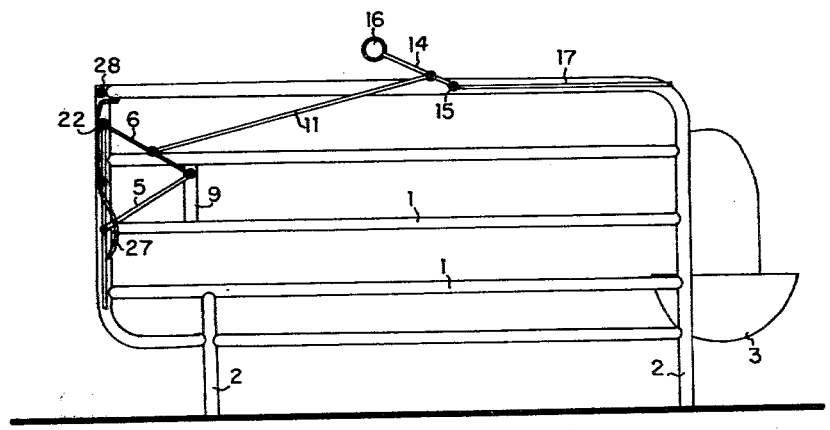
FIG. 5 is a schematic view of the cage in FIG. 4, in closed position.
Figure 6:
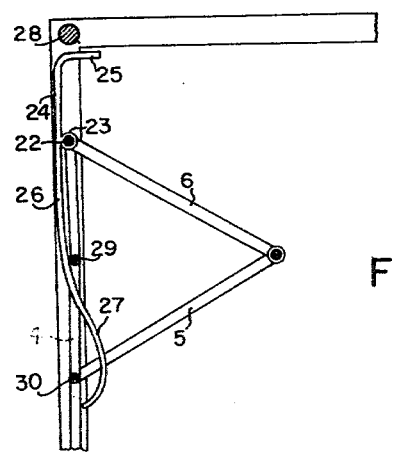
FIG. 6 is a view, in larger scale, of the bolt in FIGS. 4 and 5, in the locked position.

FIGS. 5 and 6 show the position of the lock or bolt when door 4 is closed. The equilibrium of the pendulum is such that part 26 is applied from the outside against bar 29. The back of the C-shaped 27 projects toward the inside of the cage. It can then be seen that the supporting surface 25 cannot go up beyond crosspiece 28. Therefore, from the outside, it is not possible for an animal to lift door 4. On the other hand, from the inside, when the animal moves backwardly to lift door 4, it begins by pushing back the rear part of the C-shaped 27 which rotates clockwise until it meets bar 30. At that time, surface 25 no longer is below the crosspiece 28, and the door can rise.

It is well understood that, in the embodiments in FIGS. 1 to 3, it has been assumed that the articulation of the triangle formed by 4, 5 and 6, on the frame of the cage, was done by means of one end of shaft 7 which is solid on the triangle running through a hole 8 of a tab 9 of the frame. However, the corresponding hole may be provided at the apex of the triangle. The shaft end may be affixed to the frame, without as much as leaving the scope of the present invention.

In the embodiment in FIGS. 4 to 6, it must be understood that the hole, inside which the ends of shaft 7 fit into and pivot about, is circular, and no longer oval-shaped, as in the preceding examples of execution.

Although the principles of the present invention have been described above with respect to particular embodiments, it must be understood that the description was given only as an example, and that the invention is not limited because of them.

I claim:

1. An automatic lock or bolt for the door of an animal-raising cage, with means for automatically opening and closing a door system, said cage comprising a door mounted on and pivoting around a shaft, said door descending to a vertical position in closing, or rising to a horizontal position in opening, link means extending between said door and said opening means for limiting the positions of said door; and means for positively locking the door responsive to a closing of the door, and means for precluding an unlocking of said positively locked door except by applying a horizontal push on the door, said push being from the inside toward the outside of the cage.

2. An automatic lock or bolt for the door of an animal-raising cage, with means for automatically opening and closing a door system, said cage comprising a door mounted on and pivoting around a shaft, said door descending to a vertical position in closing, or rising to a horizontal position in opening, link means extending between said door and said opening means for limiting the positions of said door; and means for positively locking the door responsive to a closing of the door, and means for precluding an unlocking of said positively locked door except by applying a horizontal push on the door, said push being from the inside toward the outside of the cage, characterized in that said lock or bolt is constituted by an L-shaped hook, with an upwardly exiting opening, mounted on a fixed part of the frame of the cage, and catch means mounted on a tab solidly fixed on the door, the catch engaging into the hook when the door reaches its vertical position, at least one axis about which the door pivots, being on the side of the hook, said axis being supported by an oval-shaped hole so that said shaft will shift inwardly into the cage when the door is in its vertical position in order to bring the catch into the bottom of the L-shape of the hook.

3. An automatic lock or bolt for the door of an animal-raising cage, with means for automatically opening and closing a door system, said cage comprising a door mounted on and pivoting around a shaft, said door descending to a vertical position in closing, or rising to a horizontal position in opening, link means extending between said door and said opening means for limiting the positions of said door; and means for positively locking the door responsive to a closing of the door, and means for precluding an unlocking of said positively locked door except by applying a horizontal push on the door, said push being from the inside toward the outside of the cage, characterized in that said lock or bolt is constituted by an L-shaped hook, opening downwardly on a tab solid on the door, and catch means mounted on a fixed part of the frame of the cage, the hook engaging the catch means when the door reaches its vertical position, at least one pivoting shaft for mounting the door, on the side of the hook, said shaft being supported by a hole having an oval shape so that said shaft will shift toward the inside of the cage when the door is in said vertical position, for causing the bottom of the L-shaped hook to wedge the catch.

4. A lock or bolt according to claim 1, characterized in that it is constituted by a pendulum mounted for pivoting around a horizontal axis on the door, said shaft being located in approximately the middle of the width of said door, the pendulum comprising an upper arm part, the end of which is horizontally bent and a lower arm part comprising a vertical part and a C-shaped part, said C-shape being relatively open and convex toward the inside of the cage, the structure of the pendulum being such that its vertical part is effectively vertical when the door is lowered, the top of the bent part of the upper arm being then immediately below a horizontal stop piece solidly mounted on the frame of the cage, the C-shaped part being located so that the back of the C is pushed from the inside toward the outside of the plane of the door to produce an angular pivoting of the pendulum so that the bent part no longer is located under the stop piece when the door begins to rise from the inside.

5. A lock or bolt according to claim 4, characterized in that a first stop piece limits the angular rotation of the inferior arm of the pendulum toward the inside of the cage.

6. A lock or bolt according to claim 4 or 5, characterized in that a second stop piece limits the angular rotation of the inferior arm of the pendulum toward the outside of the cage.

7. An animal-feeding cage which enables an animal either to enter the cage and close a door behind it so that other animals cannot thereafter enter or back out of the cage and leave its door open so that other animals can thereafter enter, said cage comprising: a generally rectangular stall having a door horizontally pivotally mounted on one end thereof, and a feed trough on the other end thereof, curtain means suspended on a horizontal pivot in said cage and located between said door and said feed trough at a position where the animal must push against said curtain to reach said feed trough, linkage means interconnecting said door and said curtain to lower said door when said curtain is pushed up or to lower said curtain when said door is pushed up, and over center counterbalance means to assist in movement of said door and curtain, said counterbalance means stably holding said door and curtain in either said door opened or said door closed position.

8. The cage of claim 7 wherein both said door and said curtain are pivotally mounted onto the top of said cage, and said counterbalance means is at the end of an extension of said curtain projecting above said cage, said extension being angularly displaced and positioned with respect to said curtain so that said counterbalance moves over center as the linkage means is moved by the door and curtain motion.

9. The cage of claim 8 wherein said door is a vertical panel mounted on one end of an elongated generally horizontal arm, the other end of said arm being pivotally mounted on said cage and said linkage comprises a rod extending from said arm to said extension.

10. The cage of claim 9 and pendulum means hang on said door inside said cage at a position which an animal engages when it backs out of said cage, said pendulum means positively locking said door when in said closed position, and said pendulum positively unlocking said door when pushed from within said cage.

* * * * *